United States Patent [19]
McGee

[11] 3,751,047
[45] Aug. 7, 1973

[54] PISTON RING ASSEMBLY
[75] Inventor: Richard P. McGee, Yeadon, Pa.
[73] Assignee: Gould Inc., Mendota Heights, Minn.
[22] Filed: June 10, 1971
[21] Appl. No.: 151,750

[52] U.S. Cl. .................................. 277/165, 277/216
[51] Int. Cl. .............................................. F16j 9/00
[58] Field of Search............... 277/165, 140, DIG. 6, 277/216, 138, 139, 154, 155, 223, 224, 143, 144, 145

[56] References Cited
UNITED STATES PATENTS
3,608,911  9/1971  Prasse........................... 277/165
2,973,978  3/1961  Oppenheim.................. 277/DIG. 6

Primary Examiner—Herbert F. Ross
Assistant Examiner—Robert I. Smith
Attorney—Seidel, Gonda & Goldhammer

[57] ABSTRACT

A piston ring assembly is comprised of a metal compression ring and an elastomeric polymeric expander ring engaging the inner diameter of the compression ring. The expander ring is made from a high temperature resistant elastomeric material which is deformed between the piston ring groove and the cast iron outer ring to form an oil seal and blow-by seal.

6 Claims, 3 Drawing Figures

PATENTED AUG 7 1973					3,751,047

INVENTOR
RICHARD P. MC GEE
BY
Seidel, Gonda & Goldhammer

ATTORNEYS 3,751,047

PISTON RING ASSEMBLY

The piston ring assembly of the present invention includes a metal compression ring such as cast iron and a non-metallic expander ring. The expander ring of the present invention forms an oil seal and blow-by seal. The compression ring has a radial gap and its outer peripheral face may be beveled so that it essentially has line contact with the cylinder wall.

The expander ring is an elastomeric polymeric material which resists temperatures up to 600° F, has specific gravity of about 1.72 to 1.86, and is resistant to corrosive oils and lubricants. The preferred material is a fluoroelastomer based on the copolymer of vinylidene fluoride and hexafluoropropylene sold commercially under the trademark Viton. The expander ring may also have a radial gap which is adapted to be offset from the radial gap in the compression ring.

The combined radial dimensions of said rings exceed the depth of the piston groove. This results in the expander ring being deformed into contact with the wall of the groove to form an oil seal and blow-by seal.

The assembly of the present invention was installed in the middle groove on a piston in a Pontiac engine. After 5,000 miles, the assembly of the present invention reduced blow-by 18 percent and reduced oil consumption 24 percent as compared with the OE piston ring assembly for that engine. When the assembly was removed from the piston, there were no carbon deposits on the rear face of the compression ring or the piston groove bottom, thereby indicating that there was an effective blow-by seal.

It is an object of the present invention to provide a novel piston ring assembly.

It is another object of the present invention to provide a piston ring assembly which reduces blow-by and oil consumption.

It is another object of the present invention to provide a piston ring assembly comprising a metal compression ring and an elastomeric polymeric expander ring for use in environments up to 600° F.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
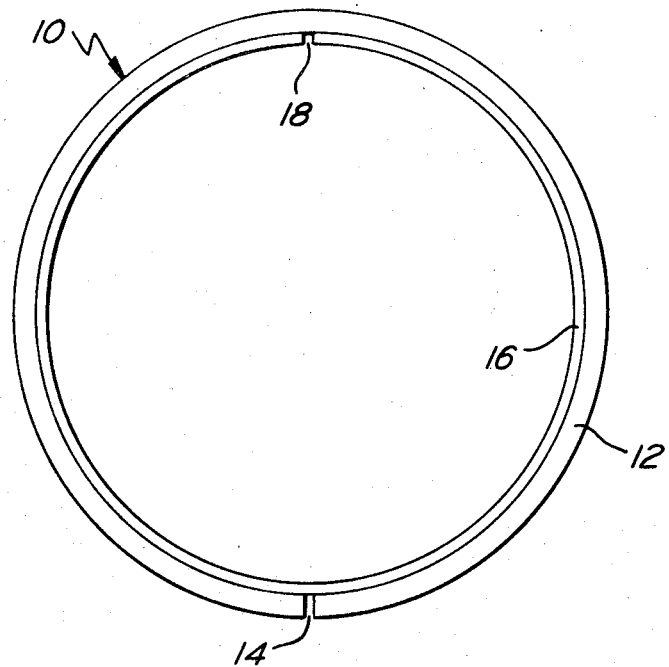
FIG. 1 is a plan view of a piston ring assembly in accordance with the present invention.

Referring to the drawing in detail, wherein like numerals indicate like elements, there is shown in FIG. 1 a piston ring assembly in accordance with the present invention designated generally as 10. The assembly 10 includes a metallic compression ring 12 made from a material such as cast iron. Ring 12 has a radial gap 14.

An expander ring 16 is in contact with the inner peripheral surface of the ring 12. Ring 16 may also have a radial gap 18 which is displaced from the gap 14. The ring 16 is an elastomeric polymeric material which resists temperatures up to 600° F, has a specific gravity of about 1.72 to 1.86, and is resistant to corrosive oils and lubricants. Any material which is capable of withstanding corrosive oils and lubricants and temperatures in the range of 600° F and higher is acceptable. The preferred material is a fluoroelastomer based on the copolymer of vinylidene fluoride and hexafluoropropylene sold commercially under the trademark Viton.

The dimensions of the rings 12 and 16 will vary from installation to installation depending upon piston size and the depth of the ring groove on the piston. Exemplary dimensions are as follows. Ring 12 has an axial width of 0.0775–0.0780 and an outer diameter of 4.0625 inches. The radial thickness across the ring 12 is 0.155–0.160. The gap 14 is 0.013–0.023. Each of these dimensions is in inches.

Exemplary dimensions for the ring 16 are as follows. Assuming that the ring 16 is circular in cross section (but need not be), it has a diameter of 0.063–0.093 inches. The gap 18 is 0.0156–0.0625 inches. The outer diameter of ring 16 corresponds to the inner diameter of ring 12.

Figure 2:
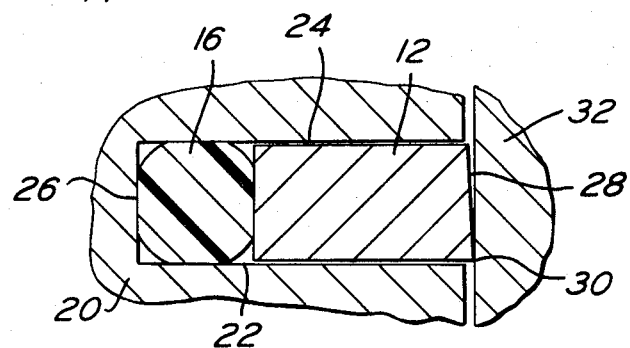
FIG. 2 is a sectional view through a piston and cylinder wall showing the piston ring assembly in FIG. 1 installed in a piston groove.

In FIG. 2, a typical piston ring assembly 10 is shown mounted within a groove of a piston 20. The groove is defined by the side walls 22 and 24 and the end wall 26. The ring 12 is provided with a beveled outer peripheral surface 28. The amount of the bevel is sufficient to assure essentially line contact at edge 30 with the surface of the cylinder 32.

The combined radial dimensions of the rings 12 and 16 exceeds the depth of the groove so that when the assembly is installed in the groove the expander ring 16 is deformed into contact with one or more of the walls defining the groove by radially inwardly directed pressure on the compression ring.

With the assembly 10 installed in a piston groove as shown in FIG. 2, the assembly 10 may be subjected to combustion gases at a temperature up to 600°F and pressures up to 1,000 psi.

Side clearance between the compression ring 12 and wall 22, 24 will vary from installation to installation, but will generally be between 0.002 and 0.004 inches. The reductions in blow-by and oil consumption referred to above involved a groove in piston 20 wherein the combined radial dimensions of rings 12 and 16 exceeded the depth of the groove by 0.012 inches. In order that ring 12 may enter the groove, ring 16 was deformed into contact with the walls of the groove as shown in FIG. 2.

Tangential tension is the force in pounds exerted by a piston ring, measured along the line of the tangent to the outside cicumference of the ring at the ring gap necessary to collapse a ring so that the gap size is reduced to the working dimension such as 0.013–0.023 referred to above for gap 14. The compression ring 12 has an inherent tangential tension of about 4 pounds. When ring 16 was deformed so that its radial dimension is decreased by 0.012 inches, the ring 12 then has a tangential tension of about 8 to 12 pounds.

Figure 3:
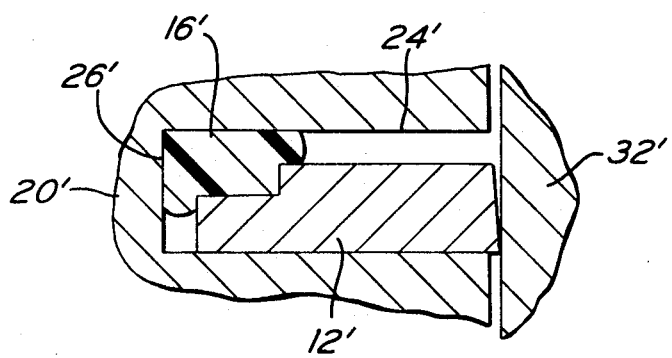
FIG. 3 is a view similar to FIG. 2 but showing an alternative piston ring assembly in accordance with the present invention.

In FIG. 3 there is illustrated another embodiment of the present invention wherein ring assembly 10' is the same as that described above except as is made clear hereinafter. Hence, corresponding elements have corresponding primed numerals.

In FIG. 3, the ring 12' has a notch on its inner periphery for receipt of the ring 16'. In this embodiment the ring 16' only contacts walls 24' and 26'. The dimensions of rings 12' and 16' differ from those of assembly 10. Otherwise, the embodiment in FIG. 3 is the same as the embodiment in FIGS. 1 and 2.

The present invention may be embodied in other specific forms without departing from the spirit or essential attributes thereof and, accordingly, reference should be made to the appended claims, rather than to the foregoing specification as indicating the scope of the invention.

I claim:

1. A piston ring assembly for use in a piston groove having a particular depth comprising a metal compression ring having an outer peripheral surface at an acute angle with respect to a horizontal plane containing the ring so as to have essentially line contact on its outer peripheral surface, said ring having a radial gap between its inner and outer peripheral surfaces, a polymeric expander ring engaging the inner peripheral surface of said compression ring, said compression ring having a radial thickness greater than the radial thickness of said expander ring, said expander ring being made from an elastomeric material having a specific gravity of between 1.72 and 1.86 and which resists corrosive oils at temperatures up to 600° F, said expander ring having a radial gap between its inner and outer peripheral surfaces which is spaced circumferentially from said compression ring gap, and the combined radial dimensions of said rings being greater than the depth of the piston ring groove so that the expander ring is deformed into contact with the groove wall when the assembly is mounted in the piston ring to form an oil seal and a blowby seal with the expander ring exerting a tangential tension force of between 4 and 8 lbs. on said compression ring.

2. A piston ring assembly in accordance with claim 1 including a piston having a peripheral groove, said ring assembly being mounted in said groove.

3. A piston ring assembly in accordance with claim 1 wherein said compression ring has a notch on its inner peripheral surface, said expander ring extending between said notch and a corner of the groove.

4. A piston ring assembly in accordance with claim 1 wherein said expander ring is a fluoroelastomer.

5. A piston ring assembly in accordance with claim 4 wherein said fluoroelastomer is a copolymer of vinylidene fluoride and hexafluoropropylene.

6. A piston ring assembly in accordance with claim 1 wherein the radial dimensions of said expander ring and compression ring before installation in the piston ring groove exceed the depth of the groove by approximately 0.010–0.012 inches.

* * * * *